Oct. 20, 1959     W. A. SPECK     2,909,757

NEUTRAL BAR ASSEMBLY

Original Filed Aug. 30, 1952

WITNESSES:
Robert C. Baird
James F. Young

INVENTOR
Willis A. Speck.
BY
ATTORNEY

United States Patent Office 2,909,757
Patented Oct. 20, 1959

2,909,757
NEUTRAL BAR ASSEMBLY

Willis A. Speck, Union, N.J., assignor to Westinghouse Electric Corporation, East Pittsburgh, Pa., a corporation of Pennsylvania Original application August 30, 1952, Serial No. 307,283, now Patent No. 2,748,365, dated May 29, 1956. Divided and this application October 20, 1955, Serial No. 541,663

4 Claims. (Cl. 339—198)

This application is a division of my copending application Serial No. 307,283, filed August 30, 1952, now Patent No. 2,748,365, issued May 29, 1956.

My invention relates, generally, to a neutral bar assembly and, more particularly, to brackets for mounting neutral bars in panelboards and the like.

In the construction of panelboards, it is frequently necessary to provide more than one neutral bar in order to connect the neutral wires for the load circuits controlled by a panelboard. Since the amount of space in a panelboard is limited, the installing of an extra neutral bar in a panelboard is a problem which, heretofore, has not been solved in an entirely satisfactory manner.

An object of my invention is to provide a rigid and secure support for a plurality of neutral bars in a panelboard.

Another object of my invention is to provide a mounting bracket which will support either one or more than one neutral bar.

A further object of my invention is to provide a mounting bracket which prevents movement of the neutral bar in horizontal and vertical planes.

Other objects of my invention will be explained fully hereinafter or will be apparent to those skilled in the art.

In accordance with one embodiment of my invention, a generally L-shaped bracket member has one leg secured to an insulating base and the other leg has an integrally formed portion parallel to the first leg bent to support a stepped conducting member. A neutral bar is mounted on each step of the conducting member. The neutral bars may be offset vertically and horizontally to facilitate the connecting of the load circuit neutral wires to the bars. The bars are substantially hollow rectangles and are attached to the conducting member by screws which extend through the bars into the conducting member. One or more terminal lugs are also attached to the conducting member, thereby electrically connecting the neutral bars to the terminal lug or lugs.

For a better understanding of the nature and objects of my invention, reference may be had to the following detailed description, taken in conjunction with the accompanying drawing, in which.

Figure 1:
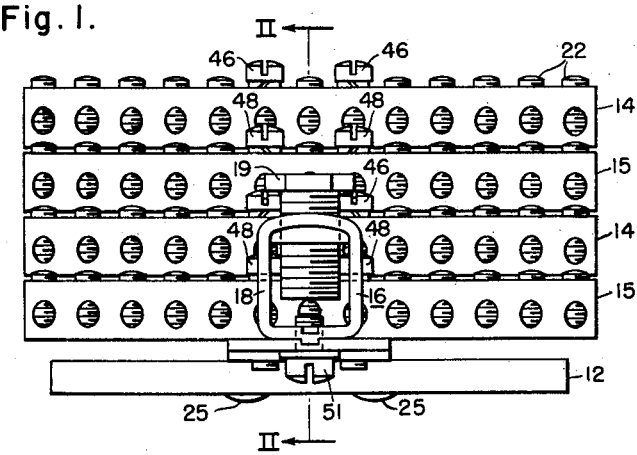
Figure 1 is a view, in front elevation, of a neutral bar assembly embodying the principal features of my invention.
Figure 2:
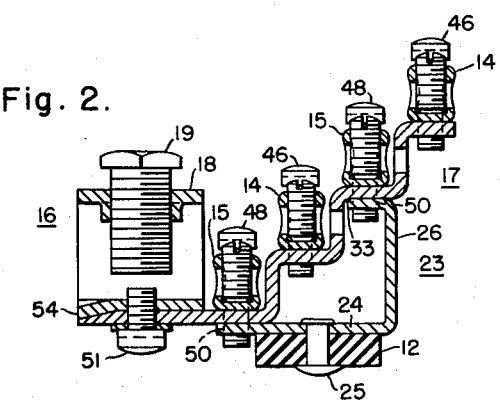
Fig. 2 is a view, in section, taken along the line II—II in Fig. 1.
Figure 3:
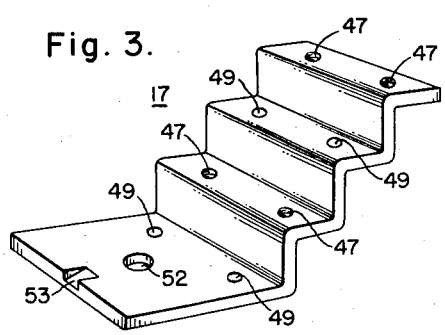
Fig. 3 is a view, in perspective, of the stepped member provided for supporting the neutral bars.

In the embodiment of the invention shown in Figs. 1, 2 and 3, a generally L-shaped bracket member 23, which may be of steel, has one leg 24 secured to an insulating base 12 by rivets 25. The other leg 26 has a portion 33 which extends parallel to and is spaced from the leg 24. The base 12 may be attached to the mounting pan of a panelboard in any suitable manner, as by bolts extending through the base and the mounting pan.

A stepped conducting member 17 is supported by the bracket 23. The member 17 is preferably formed from sheet copper or similar material having a relatively high electrical conductivity. As shown most clearly in Fig. 2, neutral bars 14 may be mounted on certain of the steps of the member 17, and neutral bars 15 may be mounted on other steps of the member 17. Each neutral bar 14 is attached to the member 17 by screws 46 which extend through the neutral bars 14 and are threaded into tapped holes 47 in the member 17. Each neutral bar 15 is attached to the member 17 by screws 48 which extend through the neutral bar 15, holes 49 in the member 17 and are threaded into holes 50 in the bracket 23. The neutral bars are preferably composed of copper. They are hollow and generally rectangular in cross-section.

Thus, the neutral bars are electrically connected to the conducting member 17 and they are mechanically supported by this member which, in turn, is supported by the steel bracket 23. As shown in Fig. 3, the member 17 is of sufficient width and the holes 47 and 49 are spaced sufficiently far apart to provide a rigid and secure support for the neutral bars.

A terminal lug 16 is provided for connecting a main neutral wire or cable to the member 17. The lug 16 has a sleeve 18 which is attached to the member 17 by means of a screw 51 which is disposed in a hole 52 in the member 17 and is threaded into the bottom of the sleeve 18. A notch 53 is provided in the one corner of the member 17 for receiving a projection 54 on the bottom of the sleeve 18 to prevent the sleeve from turning about the screw 51. A screw 19 is provided in the sleeve 18 for securing the neutral wire in the sleeve. The member 17 is of sufficient width to permit two terminal lugs to be attached to it, if desired. One lug may be used to connect an incoming cable, and the other lug used for a cable which is connected to another panel.

As shown in Fig. 1, the present structure is of a relatively narrow width and is particularly suitable for utilization in column-type panelboards of a relatively narrow width where the length of the neutral bars is limited. The required number of neutral connections is obtained by pyramiding a plurality of bars in the manner shown. If desired, additional steps may be provided on the member 17 to accommodate additional neutral bars.

From the foregoing description, it is apparent that I have provided a neutral bar assembly which may be readily installed in a panelboard cabinet and which provides a mechanically rigid and electrically secure mounting for one or more neutral bars. The mounting bracket may be readily constructed since the L-shaped member may be formed from sheet steel by well-known punching and bending operations. Likewise, the stepped member may be readily formed from sheet copper.

Since numerous changes may be made in the above-described construction, and different embodiments of the invention may be made without departing from the spirit and scope thereof, it is intended that all matter contained in the foregoing description or shown in the accompanying drawing shall be interpreted as illustrative and not in a limiting sense.

I claim as my invention:

1. In a neutral bar assembly, in combination, a base, a generally L-shaped member having one leg secured to the base and a portion of the other leg extending parallel to and spaced from the first leg, a stepped conducting member attached to said first leg and to said parallel portion, a plurality of neutral bars attached to the conducting member, said neutral bars being supported entirely by the conducting member, and a terminal member attached to the conducting member.

2. In a neutral bar assembly, in combination, an insulating base, a generally L-shaped member having a first leg secured to the base and a portion of a second leg extending parallel to and spaced from the first leg, a stepped conducting member attached to the parallel portion of the second leg and to said first leg of the L-shaped member, a neutral bar attached to each step of the conducting member, said neutral bars being supported entirely by the conducting member, and a terminal member attached to one step of the conducting member.

3. In a neutral bar assembly, in combination, an insulating base, a generally L-shaped metal bracket having a first leg secured to the base and a second leg extending substantially perpendicularly to the base, a stepped conducting member attached to the legs of said bracket and supported by the bracket, a plurality of neutral bars attached to the conducting member and supported entirely by the conducting member, and a terminal member attached to the conducting member.

4. In a neutral bar assembly, in combination, an insulating base, a generally L-shaped metal bracket having a first leg secured to the base and a second leg extending substantially perpendicularly to the base, a stepped conducting member attached to the legs of said bracket and supported by the bracket, said stepped conducting member having first portions disposed parallel to the first leg of the bracket and second portions disposed parallel to the second leg of the bracket, neutral bars attached to said first portions of the conducting member, the height of each neutral bar being substantially equal to the height of one of said second portions of the conducting member, and a terminal member attached directly to the conducting member.

References Cited in the file of this patent

UNITED STATES PATENTS

| | | |
|---|---|---|
| 2,411,014 | Warnke | Nov. 12, 1946 |
| 2,511,995 | Robertson et al. | June 20, 1950 |

OTHER REFERENCES

Ilsco, "Electrical Mfg.", November 1954, page 228.